United States Patent [19]
Nelson et al.

[11] Patent Number: 5,912,948
[45] Date of Patent: Jun. 15, 1999

[54] AUTOMATIC SCREENING APPARATUS AND METHOD FOR USE WITH TELEPHONE ANSWERING DEVICES

[75] Inventors: Avi Nelson, North Reading; Leon Ferber, Waltham, both of Mass.

[73] Assignee: Vertizon Corporation, Malden, Mass.

[21] Appl. No.: 08/763,043

[22] Filed: Dec. 10, 1996

[51] Int. Cl.⁶ .................................................. H04M 3/20
[52] U.S. Cl. .............................. 379/79; 379/377; 379/419
[58] Field of Search .......................... 379/67.1, 78, 72, 379/79, 80, 81, 82, 89, 350, 372, 377, 380, 387, 419, 421, 422

[56] References Cited

U.S. PATENT DOCUMENTS

| | | | |
|---|---|---|---|
| 3,474,196 | 10/1969 | Bottos | 179/103 |
| 4,069,397 | 1/1978 | Hashimoto | 179/6 R |
| 4,152,547 | 5/1979 | Theis | 179/6 R |
| 4,286,113 | 8/1981 | Cronin | 379/67 |
| 4,608,458 | 8/1986 | Hashimoto | 179/2 A |
| 4,700,383 | 10/1987 | Takagi et al. | 379/421 |
| 4,747,128 | 5/1988 | Chan et al. | 379/194 |
| 4,881,259 | 11/1989 | Scordato | 379/58 |
| 4,941,166 | 7/1990 | Waldman et al. | 379/67 |
| 4,941,203 | 7/1990 | Patsiokas et al. | 455/53 |
| 5,060,256 | 10/1991 | Borbas et al. | 379/92 |
| 5,111,502 | 5/1992 | McClure et al. | 379/380 |
| 5,138,652 | 8/1992 | Hashimoto | 379/67 |
| 5,243,642 | 9/1993 | Wise, Jr. et al. | 379/82 |
| 5,259,022 | 11/1993 | Kuok et al. | 379/67 |
| 5,361,295 | 11/1994 | Solomon et al. | 379/67.1 |
| 5,388,150 | 2/1995 | Schneyer et al. | 379/67 |
| 5,481,596 | 1/1996 | Comerford | 379/67 |
| 5,511,111 | 4/1996 | Serbetcioglu et al. | 379/67 |
| 5,526,406 | 6/1996 | Luneau | 379/61 |
| 5,548,636 | 8/1996 | Bannister et al. | 379/201 |
| 5,581,604 | 12/1996 | Robinson et al. | 379/67 |
| 5,651,053 | 7/1997 | Mitchell | 379/67 |
| 5,651,055 | 7/1997 | Argade | 379/88 |
| 5,668,862 | 9/1997 | Bannister et al. | 379/201 |
| 5,835,573 | 11/1998 | Dee et al. | 379/67.1 |

OTHER PUBLICATIONS

Operating Instructions for Cordless Telephone with Answering System (Sony—Digital 900 MHz) 24 pages.
Instructions for Modular Hold Button (Woods) 1 page.

*Primary Examiner*—Scott Weaver
*Attorney, Agent, or Firm*—Fish & Richardson P.C.

[57] ABSTRACT

A method and apparatus for screening an incoming telephone call from a caller on an external telephone line connected to an answering device for recording the call includes inserting into the telephone line a circuit comprising a voltage sensitive device and a bridging device for allowing a handset of a telephone set connected to the telephone line and remote from the answering device to be picked up to listen to the call. The handset of the telephone set is picked up to enable a speaker component of the telephone set without interrupting operation of the answering device. The incoming call is listened to via the enabled speaker component while the answering device operates. A microphone component of the telephone set is optionally enabled to speak with the caller. The operation of the answering device may be interrupted by pressing a switch.

18 Claims, 4 Drawing Sheets

AUTOMATIC SCREENING APPARATUS AND METHOD FOR USE WITH TELEPHONE ANSWERING DEVICES

BACKGROUND OF THE INVENTION

This invention relates to telephone answering devices, and in particular, automatic screening devices used with telephone answering devices to screen incoming calls from remote telephone sets.

As shown in FIG. 1, a telephone answering device 20 is commonly used in conjunction with one or more telephone sets 30, 40, 50 on a single external telephone line 10 to receive incoming calls. Answering device 20 is typically placed in series with and located in the same unit as or near one of the telephone sets, e.g., telephone set 30. Telephone sets 30, 40, 50 may be located in separate locations, e.g., different rooms of a house.

When a call is received on telephone line 10, all of the telephone sets 30, 40, 50 connected to line 10 ring for a short period prior to actuation of answering device 20. If the call is not answered by picking up one of the telephone sets 30, 40, 50 during the ringing period, answering device 20 connects to line 10, plays a recorded instruction or outgoing message directing the caller to leave a message for the called party and records the caller's message for subsequent retrieval. The caller's message may be broadcast by answering device 20 as it is being recorded.

For one type of conventional answering device, if any of the telephone sets 30, 40, 50 is picked up during operation of the answering device, operation of the answering device is interrupted, and the called party may speak with the caller via the telephone set. The called party may thus "screen" incoming calls by listening to the caller's message as it is being recorded and broadcast by the answering device. If the called party does not desire to speak with the caller, he simply does not pick up any of telephone sets 30, 40, 50 and allows answering device 20 to complete the recording of the caller's message for retrieval at a later time. But this type of call screening is effective only where the called party is in proximity to answering device 20 to listen to the caller's message as it is being recorded and broadcast.

In a known device for putting a call on "hold", an apparatus is connected to the telephone line in series with a telephone set which puts incoming calls on hold. After the called party has picked up the handset of the telephone set, he can depress a switch on the apparatus that disables the microphone in the telephone set. The called party may then listen to the communications on the line, although the caller cannot hear any sounds originating from the telephone set of the called party. To resume the conversation with the caller, the called party again depresses the switch, which enables the microphone in the telephone set. This known device is not designed to work in conjunction with a telephone answering device.

SUMMARY OF THE INVENTION

It is an object of the present invention to provide an automatic apparatus and method to be used in conjunction with a telephone answering device for screening incoming telephone calls from any one of a plurality of remotely located telephone sets connected to a single telephone line.

In general, in one aspect, the invention features a method of screening an incoming telephone call from a caller on an external telephone line connected to an answering device for recording the call. A circuit is inserted into the telephone line, the circuit including a voltage sensitive device and a bridging device for allowing a handset of a telephone set connected to the telephone line and remote from the answering device to be picked up to listen to the call. The handset of the telephone set is picked up to enable a speaker component of the telephone set without interrupting operation of the answering device. The incoming call is listened to via the enabled speaker component while the answering device operates. A microphone component of the telephone set is optionally enabled to speak with the caller.

Implementations of the invention may also include one or more of the following features. The operation of the answering device may be interrupted. The interrupting may be accomplished by pressing a switch. Pressing the switch may enable the microphone component of the telephone set.

In general, in another aspect, the invention features an apparatus for screening an incoming telephone call on an external telephone line, the incoming telephone call being answered by an answering device which records the call. A voltage sensitive device is configured in series with a telephone set remote from the answering device, the voltage sensitive device having a threshold voltage such that current flows through the voltage sensitive device when the threshold voltage across the voltage sensitive device is exceeded. A bridging device is connected to the telephone set to allow a handset of the telephone set to be picked up to listen to the call. A switch optionally interrupts operation of the answering device to connect the telephone set to the incoming telephone call by creating a voltage across the voltage sensitive device which exceeds the threshold voltage.

Implementations of the invention may also include one or more of the following features. The voltage sensitive device, the bridging device and the switch may all be configured in parallel with each other. The switch may be capable of connecting the telephone set to the call by enabling a microphone in the telephone set.

The voltage across the voltage sensitive device which exceeds the threshold voltage may be created by picking up the handset of the telephone set with no answering device operating. The threshold voltage may be less than the voltage created by picking up the handset of the telephone set but greater than the net voltage created when the answering device is operating and the handset of the telephone set is picked up.

The voltage sensitive device may be a diac. The bridging device may be a capacitor. The switch may be a spring-loaded on-off switch.

The bridging device may be capable of enabling a speaker in the telephone set.

The apparatus may be in the telephone line between the telephone set and a wall jack. The apparatus may be in the telephone line within a chassis of the telephone set. The apparatus may be in the telephone line within the handset of the telephone set.

The switch may be actuated by a push button key on the telephone set.

In general, in another aspect, the invention features an apparatus for screening an incoming telephone call on an external telephone line, the incoming telephone call being answered by an answering device which records the call. A diac is configured in series with a telephone set remote from the answering device, the diac having a threshold voltage such that current flows through the diac when the threshold voltage across the diac is exceeded, the threshold voltage being less than the voltage created by picking up a handset of the telephone set but greater than the net voltage created when the answering device is operating and the handset of the telephone set is picked up. A capacitor is connected to the telephone set to allow the handset of the telephone set to be picked up to listen to the call by enabling a speaker in the telephone set. A spring-loaded switch optionally interrupts operation of the answering device to connect the telephone set to the incoming telephone call by creating a voltage across the diac which exceeds the threshold voltage.

Implementations of the invention may also include one or more of the following features. The switch may be capable of enabling a microphone in the telephone set. The apparatus may be in the telephone line between the telephone set and a wall jack.

The telephone screening system of the present invention has the advantage of allowing a called party to screen incoming telephone calls from a remotely located telephone set.

Other features and advantages of the invention will become apparent from the following detailed description, and from the claims.

DESCRIPTION OF THE PREFERRED EMBODIMENTS

The telephone screening device of the present invention automatically operates to permit a called party to pick up a remote telephone set without interrupting operation of an answering device connected to the same telephone line. The called party can then listen to the caller's message as it is being recorded. If the called party wishes to speak with the caller, he interrupts operation of the answering device and is able to speak with the caller by pressing an on-off switch on the screening device.

Figure 1:
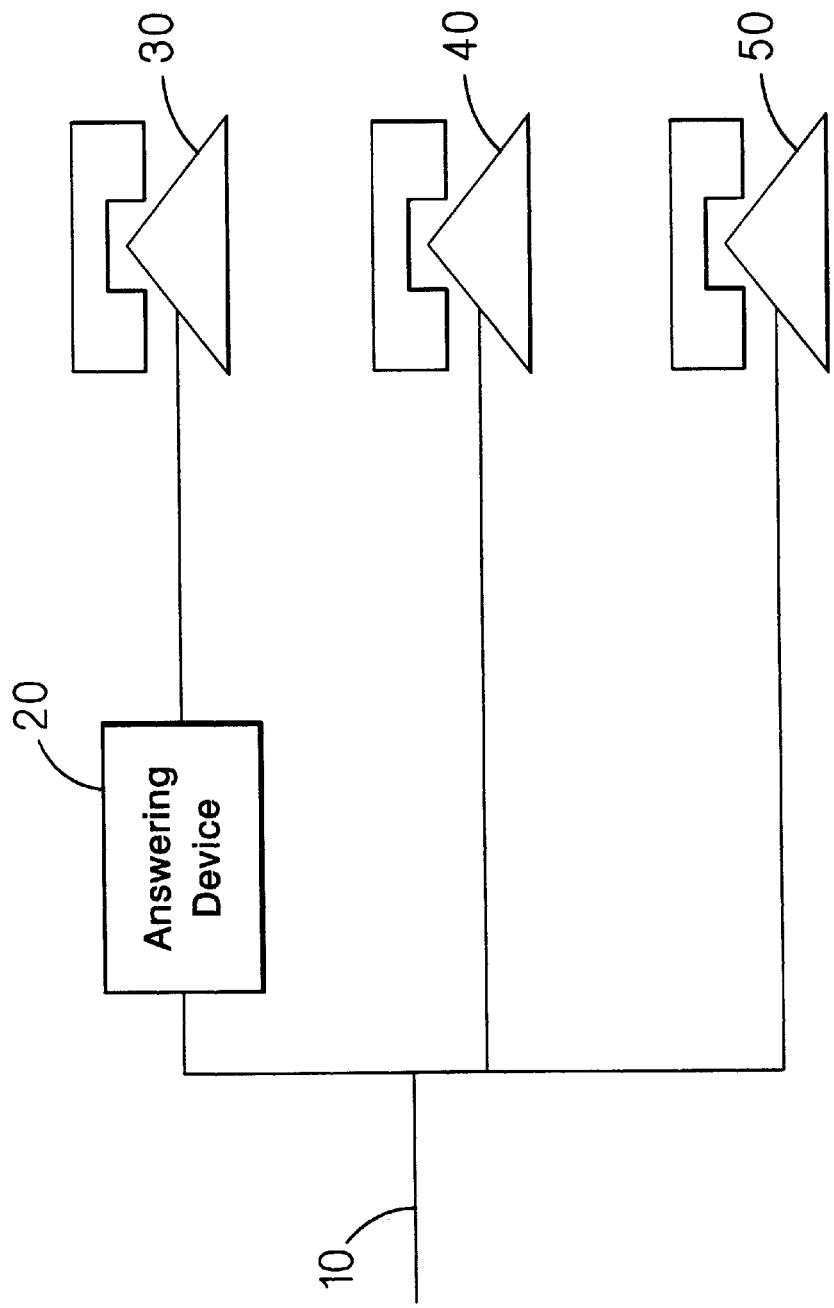
FIG. 1 is a block diagram showing an arrangement of telephone sets and a telephone answering device connected to a single telephone line.
Figure 2:
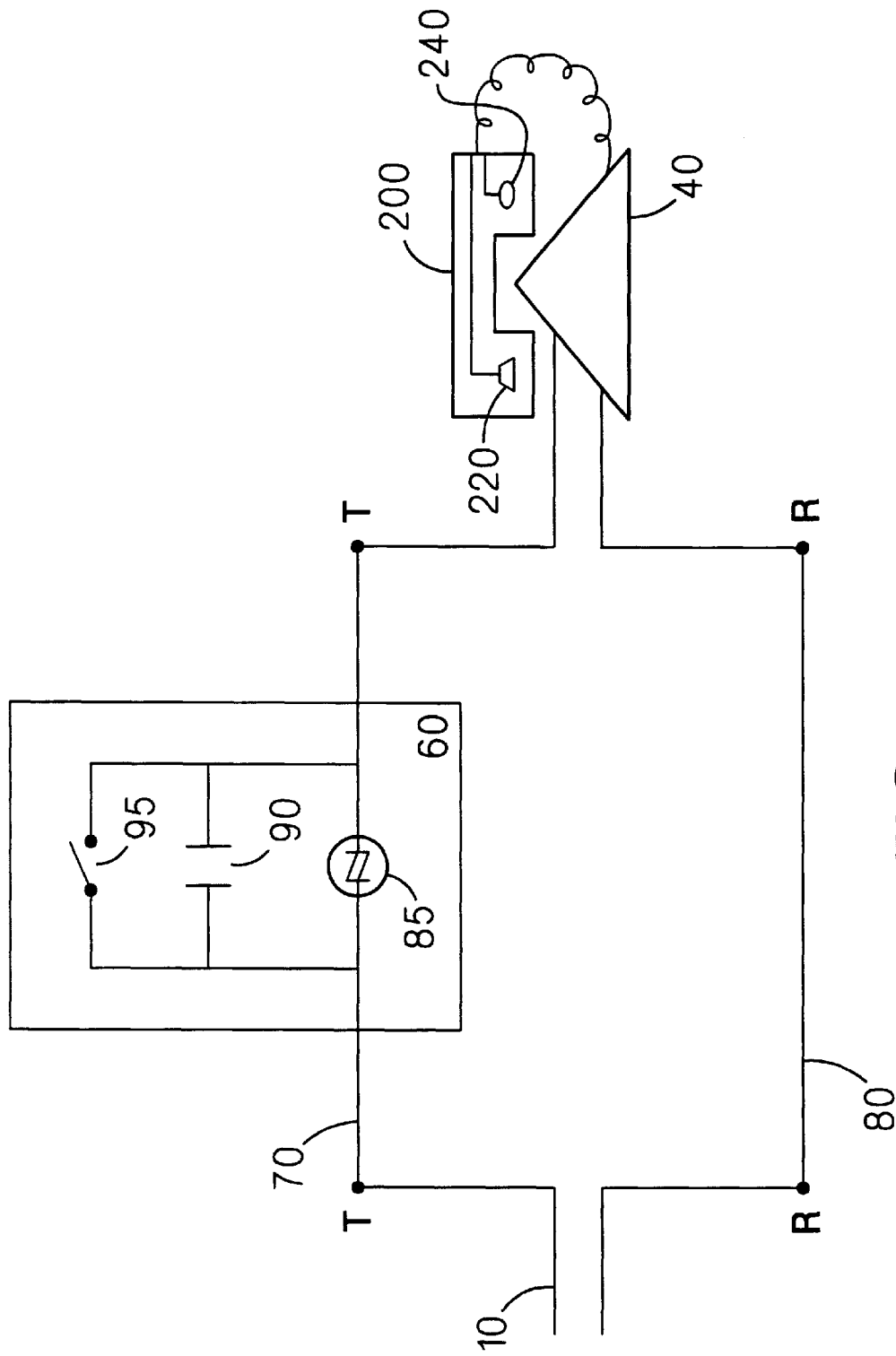
FIG. 2 is a circuit diagram showing a circuit for implementing the telephone screening system of the present invention.

The present invention may be implemented in various ways. For example, as shown in FIG. 2, the telephone screening device 60 may be implemented as a circuit connected in series with either the tip (T) wire 70 or the ring (R) wire 80 of telephone set 40. Telephone screening device 60 may be used in conjunction with any telephone set 30, 40, 50, whether or not the telephone set is connected directly or is in proximity to answering device 20.

Telephone set 40 has a handset 200 that contains a speaker 220 which makes an incoming call audible to the called party and a microphone 240 which converts sound made in the vicinity of handset 200 into electrical signals which are transmitted to the caller's telephone set.

The circuit contains a voltage sensitive device which functions as a bilateral switch, such as a diac 85. Diac 85 is a four-layer diode that permits current to flow when a threshold voltage is applied across it. The circuit also consists of a capacitor 90 and a spring loaded on-off switch 95. Diac 85, capacitor 90 and switch 95 are configured in parallel with each other.

When the handset of telephone set 40 is lifted, there is a large voltage across diac 85 which exceeds the threshold voltage of diac 85. If there is no answering device connected to external telephone line 10, the large voltage will cause current to flow through diac 85 and complete the circuit. Telephone set 40 is then in the "off hook" state, which indicates that a call has been answered or can be made. Thus, the circuit does not interfere with normal operation of telephone set 40.

If there is an answering device 20 connected to telephone line 10, after telephone set 40 rings and answering device 20 has answered the call, the voltage between the telephone wire terminals T and R drops. At this point, if the handset of telephone set 40 is lifted, the voltage between the T and R telephone wires 70 and 80 increases, but the sum of the voltage on the wires 70 and 80 across diac 85 does not exceed the threshold level of diac 85, so current does not flow through diac 85. The "off hook" state of telephone set 40 is not detected by answering device 20, which continues to operate to record the caller's message.

Diac 85 is chosen such that when answering device 20 has not answered the call and handset 200 of telephone set 40 is lifted, the voltage across T and R wires 70 and 80 is greater than the threshold value, but such that when answering device 20 has answered the call and the handset 200 of telephone set 40 is lifted, the net voltage across the wires is less than the threshold value.

Capacitor 90 provides an audio path across diac 85, so that the called party can listen to communications on telephone line 10. The value of capacitor 90 is chosen so that the audio signal is transmitted along T wire 70 to speaker 220 of telephone set 40 without interrupting operation of the answering device and without enabling microphone 240.

When switch 95 is closed, the circuit is shorted and diac 85 is by-passed. Closing switch 95 causes current to flow through T and R telephone wires 70 and 80, which shuts off the answering device and enables microphone 240 in handset 200, allowing the called party to talk with the caller via telephone set 40. If switch 95 is then released, i.e. opened, the voltage across diac 85 rapidly builds to where it exceeds the threshold level of diac 85, so current can flow through diac 85. Telephone set 40 remains in the "off hook" state even after the called party releases switch 95 and opens that branch of the circuit because current continues to flow through diac 85 to microphone 240 of telephone set 40. Spring loaded switch 95 remains in the open position when it is not being depressed.

Figure 3:
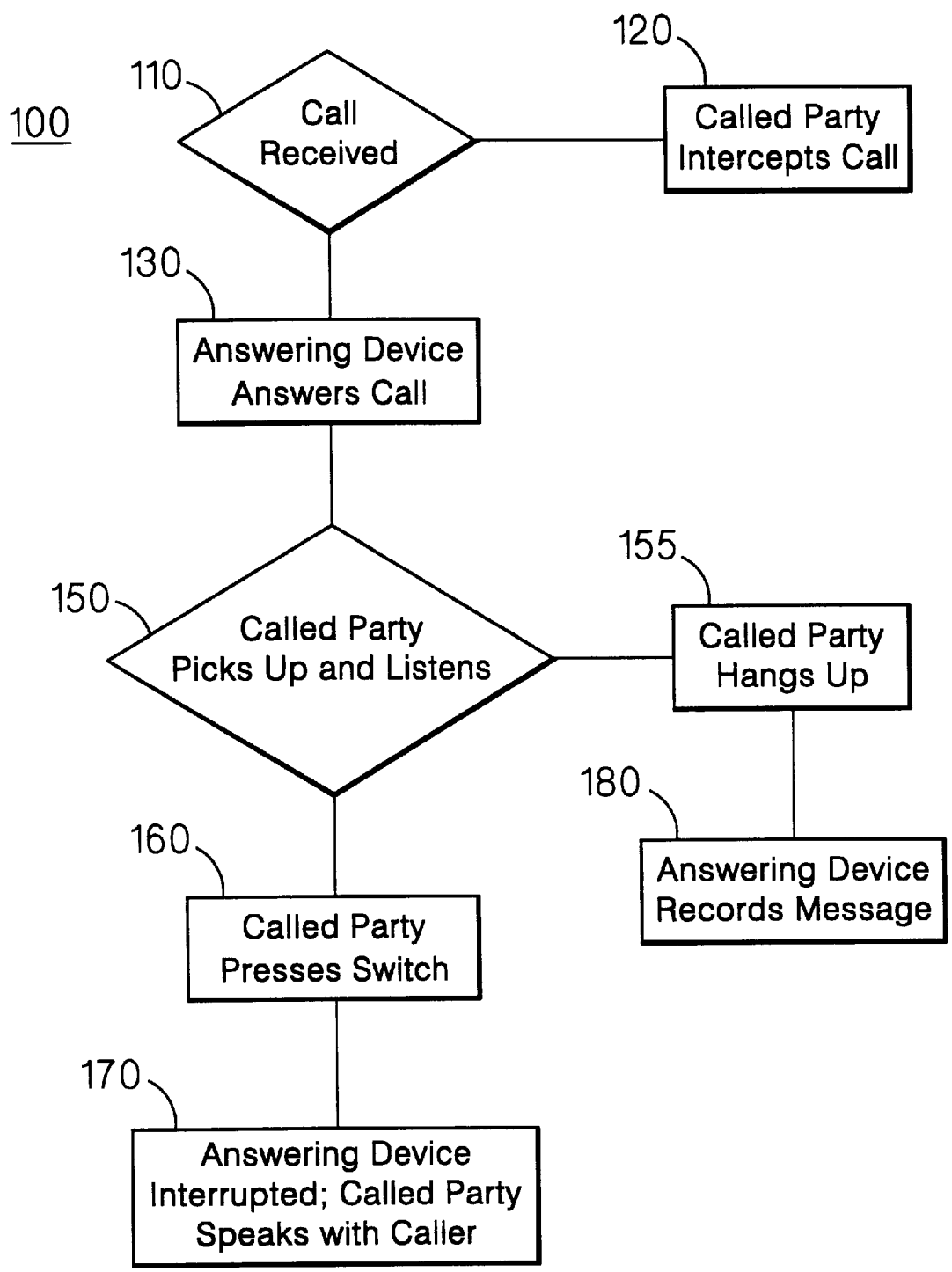
FIG. 3 is a flow diagram showing the operation of the telephone screening function of the present invention.
Figure 4:
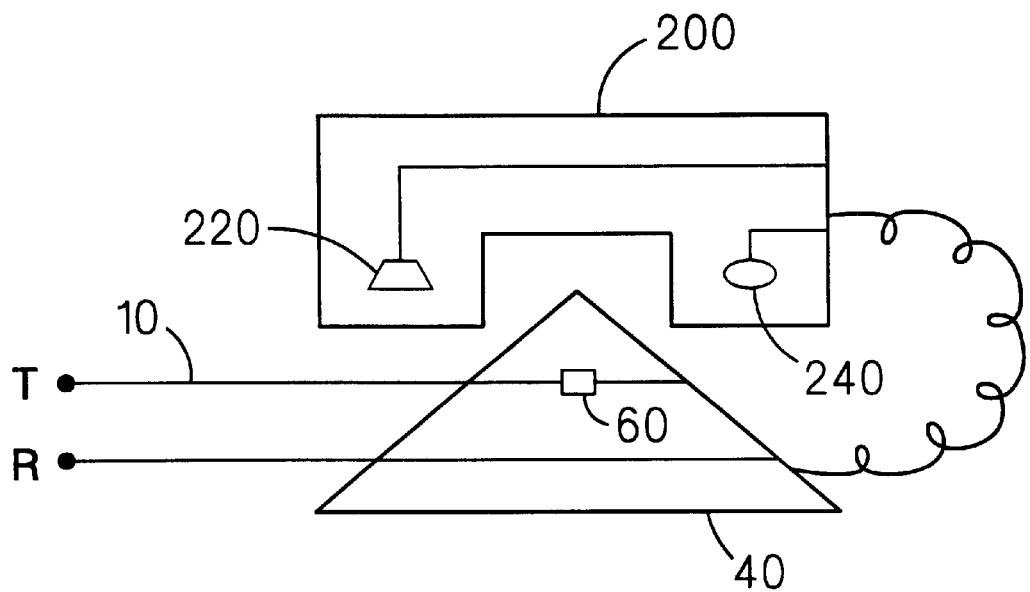
FIGS. 4 and 5 show the telephone screening device of the present invention connected to the telephone line in the chassis of the telephone set or in the handset, respectively.
Figure 5:
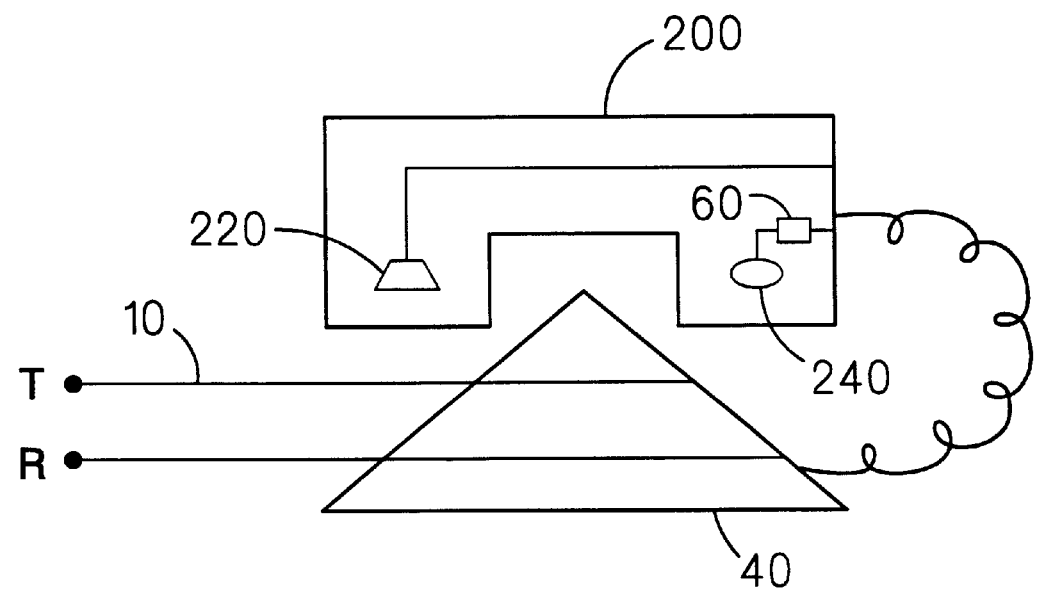

FIG. 3 shows the operation 100 of the automatic screening function. A call is received over telephone line 10 (step 110). If the called party intercepts the call before answering device 20 answers it (step 120), the remaining steps of the automatic screening function are not implemented. If the called party does not intercept the call, answering device 20 answers the call (step 130).

While answering device 20 operates, the called party may pick up any telephone set 30, 40, 50 connected to telephone line 10 and listen to the caller's message through speaker 220 in handset 200 as the call is being recorded (step 150) without interrupting operation of answering device 20. If the called party wishes to speak with the caller, he presses switch 95 (step 160), which enables microphone 240, and the called party may speak directly with the caller (step 170). If the called party does not wish to speak with the caller, he need only hang up the handset of the telephone set that was picked up without pressing switch 95 (step 155) The answering device will then continue its operation and record the caller's message (step 180).

The device of the present invention may consist of a self-contained circuit which is inserted in the telephone line, between the telephone set and the wall jack. Alternatively, the device may be incorporated into the chassis or handset of the telephone set (FIGS, 4 and 5), the switch for the circuit placed in a conspicuous location on the face of the telephone set or on the handset for ease of actuation by the called party.

Alternatively, the call screening device can be implemented as part of the telephone set itself by incorporating the circuit described above within the circuitry of the telephone set. One or more of the existing push button keys on the telephone set, namely the numbered keys and the "*" and "#" keys, can have the dual functions of operating the telephone set (e.g., to dial a telephone number) and the call screening device. For example, an additional set of contacts may be placed beneath one of the less frequently used keys, such as the "*" key, to act as the switch for the call screening device.

The arrangement described above enables the called party, in conjunction with a telephone answering device, to automatically screen calls from telephone sets remote from the answering device.

Other embodiments are within the scope of the following claims.

What is claimed is:

1. A method of screening an incoming telephone call from a caller on an external telephone line connected to an answering device for recording the call, comprising:

inserting into the telephone line a circuit comprising a voltage sensitive device and a bridging device for allowing a handset of a telephone set connected to the telephone line and remote from the answering device to be picked up to listen to the call;

picking up the handset of the telephone set to enable a speaker component of the telephone set without interrupting operation of the answering device;

listening to the incoming call via the enabled speaker component while the answering device operates; and optionally pressing a switch enabling a microphone component of the telephone set to speak with the caller and interrupting the operation of the answering device.

2. An apparatus for screening an incoming telephone call on an external telephone line, the incoming telephone call being answered by an answering device which records the call, comprising:

a voltage sensitive device configured in series with a telephone set remote from the answering device, the voltage sensitive device having a threshold voltage such that current flows through the voltage sensitive device when the threshold voltage across the voltage sensitive device is exceeded;

a bridging device connected to the telephone set to allow a handset of the telephone set to be picked up to listen to the call; and a switch for optionally interrupting operation of the answering device to connect the telephone set to the incoming telephone call by creating a voltage across the voltage sensitive device which exceeds the threshold voltage.

3. The apparatus of claim 2 wherein the voltage sensitive device, the bridging device and the switch are all configured in parallel with each other.

4. The apparatus of claim 2 wherein the switch is capable of connecting the telephone set to the call by enabling a microphone in the telephone set.

5. The apparatus of claim 2 wherein the voltage across the voltage sensitive device which exceeds the threshold voltage is created by picking up the handset of the telephone set.

6. The apparatus of claim 2 wherein the threshold voltage is less than the voltage created by picking up the handset of the telephone set but greater than the net voltage created when the answering device is operating and the handset of the telephone set is picked up.

7. The apparatus of claim 2 wherein the voltage sensitive device is a diac.

8. The apparatus of claim 2 wherein the bridging device is a capacitor.

9. The apparatus of claim 2 wherein the switch is a spring-loaded on-off switch.

10. The apparatus of claim 2 wherein the bridging device is capable of enabling a speaker in the telephone set.

11. The apparatus of claim 2 wherein the apparatus is connected to the telephone line between the telephone set and a wall jack.

12. The apparatus of claim 2 wherein the apparatus is connected to the telephone line within a chassis of the telephone set.

13. The apparatus of claim 2 wherein the apparatus is connected to the telephone line within the handset of the telephone set.

14. The apparatus of claim 2 wherein the switch is actuated by a push button key on the telephone set.

15. The apparatus of claim 2 further comprising a microphone and a speaker in the telephone set;

wherein the bridging device is capable of enabling the speaker and the switch is capable of enabling the microphone.

16. An apparatus for screening an incoming telephone call on an external telephone line, the incoming telephone call being answered by an answering device which records the call, comprising:

a diac configured in series with a telephone set remote from the answering device, the diac having a threshold voltage such that current flows through the diac when the threshold voltage across the diac is exceeded, the threshold voltage being less than the voltage created by picking up a handset of the telephone set but greater than the net voltage created when the answering device is operating and the handset of the telephone set is picked up;

a capacitor connected to the telephone set to allow the handset of the telephone set to be picked up to listen to the call by enabling a speaker in the telephone set; and a spring-loaded switch for optionally interrupting operation of the answering device to connect the telephone set to the incoming telephone call by creating a voltage across the diac which exceeds the threshold voltage.

17. The apparatus of claim 16 wherein the switch is capable of enabling a microphone in the telephone set.

18. The apparatus of claim 16 wherein the apparatus is connected to the telephone line between the telephone set and a wall jack.

* * * * *